(12) United States Patent
Igaki

(10) Patent No.: US 11,408,520 B2
(45) Date of Patent: Aug. 9, 2022

(54) CONTROL VALVE

(71) Applicant: SHIMADZU CORPORATION, Kyoto (JP)

(72) Inventor: Hiroaki Igaki, Shiga (JP)

(73) Assignee: SHIMADZU CORPORATION, Kyoto (JP)

( * ) Notice: Subject to any disclaimer, the term of this patent is extended or adjusted under 35 U.S.C. 154(b) by 302 days.

(21) Appl. No.: 16/640,350

(22) PCT Filed: Sep. 13, 2017

(86) PCT No.: PCT/JP2017/033001
§ 371 (c)(1),
(2) Date: Feb. 20, 2020

(87) PCT Pub. No.: WO2019/053799
PCT Pub. Date: Mar. 21, 2019

(65) Prior Publication Data
US 2020/0355280 A1    Nov. 12, 2020

(51) Int. Cl.
*F16K 11/07*    (2006.01)
*B66F 9/075*    (2006.01)
*B66F 9/22*    (2006.01)

(52) U.S. Cl.
CPC ...... *F16K 11/0708* (2013.01); *B66F 9/07559* (2013.01); *B66F 9/22* (2013.01)

(58) Field of Classification Search
CPC . F16K 11/07; F16K 11/0708; Y10T 137/8671
See application file for complete search history.

(56) References Cited

U.S. PATENT DOCUMENTS 3,557,824 A * 1/1971 Krehbiel ............. F16K 11/0712
                                                         251/368
4,009,864 A * 3/1977 Schexnayder ...... F16K 11/0708
                                                         251/282
(Continued)

FOREIGN PATENT DOCUMENTS

JP    S5455956    5/1979
JP    S57195097   11/1982
(Continued)

OTHER PUBLICATIONS

Xiaojuan Wang, "Research And Application Of Multi-Way Valve Spool Throttle Groove On Small Hydraulic Excavator", Chinese Master's Thesis Full-text Database, Engineering Science and Technology II, Mar. 16-Apr. 15, 2012, with English translation thereof, pp. 1-10.

(Continued)

*Primary Examiner* — Kelsey E Cary
(74) *Attorney, Agent, or Firm* — JCIPRNET

(57) ABSTRACT

A notch 41, which is formed on a land 31 that, in a main spool 30, blocks a reach-in side actuator port A from communicating with a second passage T, comprises a first notch and a second notch. The first notch comprises a first region that has a semi-circular shape in the plan view and in which the area of an opening between a valve body 40 and the land 31 becomes gradually larger, and a second region that is connected to the first region and in which the area of an opening between the valve body 40 and the land 31 is constant, and the second notch comprises a third region that has a semi-circular shape in the plan view and in which the area of the opening between the valve body 40 and the land 31 gradually becomes larger, and a fourth region that is connected to the third region and in which the area of the (Continued)

opening between the valve body 40 and the land 31 is constant.

2 Claims, 10 Drawing Sheets

(56) References Cited

U.S. PATENT DOCUMENTS

| | | | | |
|---|---|---|---|---|
| 4,133,510 | A * | 1/1979 | Lorimor | F15B 13/0402 137/596.13 |
| 4,313,467 | A * | 2/1982 | Lang | B62D 5/08 251/324 |
| 6,397,890 | B1 * | 6/2002 | Mickelson | F16K 11/07 137/625.69 |
| 6,450,194 | B1 * | 9/2002 | Wasson | F15B 13/0402 137/625.69 |
| 2003/0037826 | A1 * | 2/2003 | Hoefling | F15B 13/0402 137/625.3 |
| 2004/0000347 | A1 * | 1/2004 | Shin | F15B 13/0402 137/625.69 |
| 2004/0069359 | A1 * | 4/2004 | Buttner | F15B 13/0417 137/625.69 |
| 2008/0257142 | A1 * | 10/2008 | Matsuzaki | F16K 11/0708 60/464 |
| 2008/0308757 | A1 * | 12/2008 | Nakai | F16K 31/0613 251/129.15 |
| 2009/0139396 | A1 * | 6/2009 | Terauchi | F04B 27/0886 92/71 |
| 2014/0026546 | A1 * | 1/2014 | Bacon | F15B 13/021 251/336 |
| 2017/0306989 | A1 * | 10/2017 | Coolidge | F15B 11/161 |
| 2017/0350097 | A1 * | 12/2017 | Kang | E02F 3/42 |
| 2019/0390690 | A1 * | 12/2019 | Biwersi | F15B 21/0427 |

FOREIGN PATENT DOCUMENTS

| | | |
|---|---|---|
| JP | S5879103 | 5/1983 |
| JP | H0552451 | 7/1993 |
| JP | H08192761 | 7/1996 |
| JP | 2000053398 | 2/2000 |
| JP | 2001271803 | 10/2001 |
| WO | 2015049728 | 4/2015 |

OTHER PUBLICATIONS

"Office Action of China Counterpart Application", dated Oct. 12, 2020, with English translation thereof, pp. 1-16.

"International Search Report (Form PCT/ISA/210) of PCT/JP2017/033001 ," dated Nov. 14, 2017, with English translation thereof, pp. 1-4.

"Written Opinion of the International Searching Authority (Form PCT/ISA/237) of PCT/JP2017/033001," dated Nov. 14, 2017, with Partial English translation, pp. 1-4.

"Office Action of Germany Counterpart Application" with English translation thereof, dated Apr. 11, 2022, p. 1-p. 18.

* cited by examiner

CONTROL VALVE

CROSS-REFERENCE TO RELATED APPLICATION

This application is a 371 application of the international PCT application serial no. PCT/JP2017/033001, filed on Sep. 13, 2017. The entirety of the above-mentioned patent application is hereby incorporated by reference herein and made a part of this specification.

BACKGROUND OF THE INVENTION

Technical Field

The present invention relates to a control valve that is coupled to a hydraulic cylinder which moves a mast frontward and rearward in a reach forklift, the mast being used to lift and lower a fork.

Related Art

A reach forklift is configured to be capable of moving a mast, which lifts and lowers a fork, in a front-rear direction between a reach-in state which is a state that the mast is reached in and a reach-out state which is a state that the mast is reached out frontward.

In the reach forklift, a control valve that is coupled to a hydraulic cylinder used to move the mast is configured to move a spool with respect to a valve body and thereby selectively connect a first passage to which high-pressure hydraulic oil is introduced and a second passage which is open at a low-pressure region to a reach-out side actuator port for biasing a piston toward a side at which the mast is moved frontward and a reach-in side actuator port for biasing the piston toward a side at which the mast is moved rearward. Besides, in the control valve, a flow rate of the hydraulic oil is controlled by a cut-out portion (notch) formed on a land in the spool.

In the reach forklift, in a case that the reach forklift is abruptly stopped when a reach lever is operated toward a reach-out side in a state of supporting a workpiece and running, a force to cause the mast to move in a traveling direction of a vehicle body is generated due to the inertial force. Since the force is transmitted to the hydraulic cylinder, a force of the hydraulic cylinder to restrict a position of the mast in the front-rear direction becomes unstable, and a phenomenon occurs in which the mast and a fork supported by the mast come into an unstable state.

Patent Literature 1 discloses a reach control device of a reach forklift, the reach control device including a reach cylinder that causes a mast to reach, an oil control valve that adjusts, in response to an operation of a lever, an amount of hydraulic oil which is sent to the reach cylinder, a flow regulating valve arranged at an oil passage between the oil control valve and the reach cylinder, a vehicle-speed detection part that detects a vehicle speed of the reach forklift, a load detection part that detects a load carried by a fork, and a controller 5 that calculates and controls a narrowing amount of the flow regulating valve by using vehicle-speed data from the vehicle-speed detection part and load data from the load detection part.

LITERATURE OF RELATED ART

Patent Literature

Patent Literature 1: Japanese Patent Laid-Open No. 2000-53398

SUMMARY

Problems to be Solved

The reach control device disclosed in Patent Literature 1 needs to include not only the flow regulating valve but also the vehicle-speed detection part and the load detection part, and thus the device is not only expensive but also has a complicated configuration. In addition, a problem arises in that it is not easy to perform control.

The present invention is made to solve the problems, and an object thereof is to provide a control valve that has a simple configuration and is capable of stabilizing a mast even when a reach forklift is abruptly stopped during a reach-out operation.

Means to Solve Problems

The invention of claim 1 is a control valve which is coupled to a hydraulic cylinder for moving a mast frontward and rearward in a reach forklift, the mast being used for lifting and lowering a fork. The control valve moves a spool with respect to a valve body, and thereby selectively connects a first passage to which high-pressure hydraulic oil is introduced and a second passage which is open at a low-pressure region to a reach-out side actuator port for biasing a piston of the hydraulic cylinder toward a side at which the mast is moved frontward and a reach-in side actuator port for biasing the piston of the hydraulic cylinder toward a side at which the mast is moved rearward. A cut-out portion is formed on a land in the spool that blocks the reach-in side actuator port from communicating with the second passage, and the cut-out portion has a shape in which an area of an opening formed between the valve body and the land changes in two steps.

In the invention of claim 2 according to the invention of claim 1, a cut-out portion is formed on the land in the spool that blocks the reach-in side actuator port from communicating with the second passage, and the cut-out portion has a shape in which a distance between the valve body and the land changes in at least two steps.

In the invention of claim 3 according to the invention of claim 1, a cut-out portion is formed on the land in the spool that blocks the reach-in side actuator port from communicating with the second passage, and the cut-out portion includes a first region in which the area of the opening between the valve body and the land becomes gradually larger, a second region which is connected to the first region and in which the area of the opening between the valve body and the land is constant, a third region which is connected to the second region and in which the area of the opening between the valve body and the land becomes gradually larger, and a fourth region which is connected to the third region and in which the area of the opening between the valve body and the land is constant. A distance from a surface in the first region and a surface in the second region to the valve body is set as a first distance, and a distance from a surface in the third region and a surface in the fourth region to the valve body is set as a second distance longer than the first distance. The first region and the third region have a semi-circular shape in a plan view.

Effect

According to the inventions of claims 1 to 3, since the cut-out portion, which is formed on the land that, in the spool, blocks the reach-in side actuator port from communicating with the second passage, has the shape in which the area of the opening formed between the valve body and the land changes in two steps, due to the function of the cut-out portion region having a small opening area, the mast can be stabilized even when the reach forklift is abruptly stopped during a reach-out operation. In addition, due to the function of the cut-out portion region having a large opening portion, the mast can be moved at a high speed and a load of a pump that supplies hydraulic oil can be decreased to reduce an amount of power consumption.

According to the invention of claim 3, the first, second, third, and fourth regions can be easily processed.

DESCRIPTION OF THE EMBODIMENTS

Figure 1:
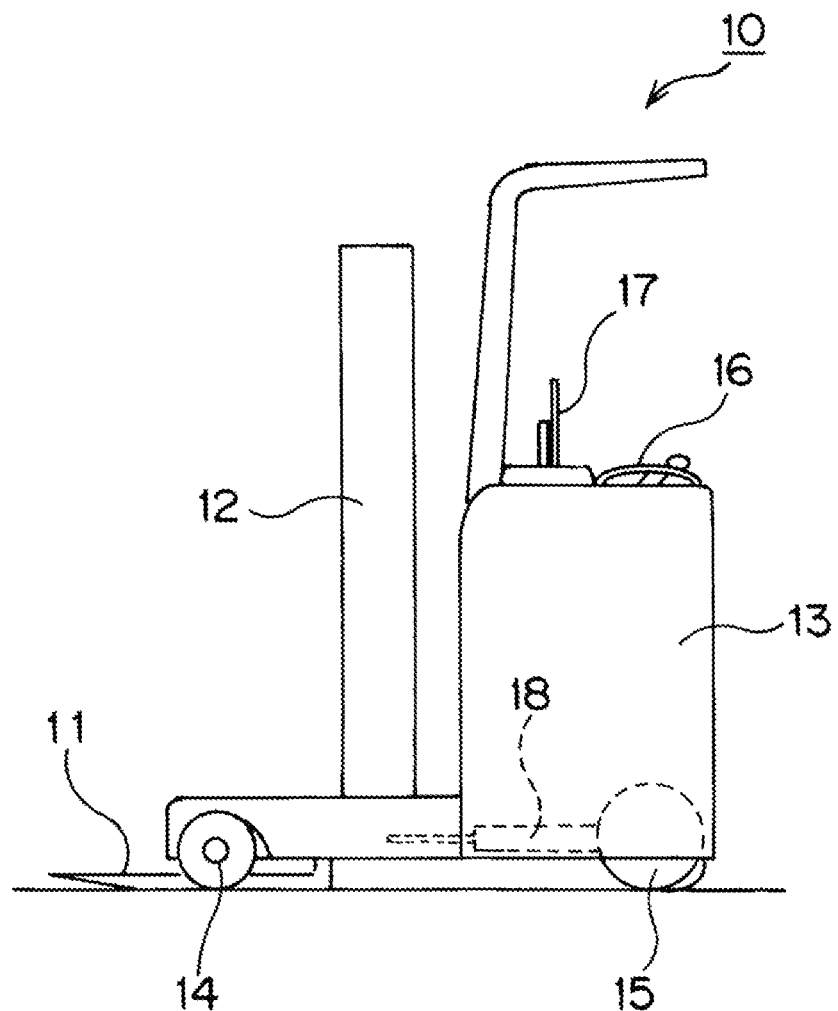
FIG. 1 is a schematic view of a reach forklift 10 to which a control valve 20 according to the present invention is applied.

Hereinafter, an embodiment of the present invention is described with reference to the drawings. First, a configuration of a reach forklift 10 is described to which a control valve 20 according to the present invention is applied. FIG. 1 is a schematic view of the reach forklift 10 to which the control valve 20 according to the invention is applied.

The reach forklift 10 is a type of reach forklift that is capable of moving a mast 12, which lifts and lowers a fork 11 that supports a workpiece, in a front-rear direction between a reach-in state which is a state that the mast is reached in and a reach-out state which is a state that the mast is reached out frontward. The reach forklift 10 includes a main body 13 having a front wheel 14 and a rear wheel 15, steering 16, and a lever 17 for executing various operations. At a lower part of the main body 13, a hydraulic cylinder 18 is arranged which moves, in the front-rear direction, the mast 12 that lifts and lowers the fork 11.

Figure 2:
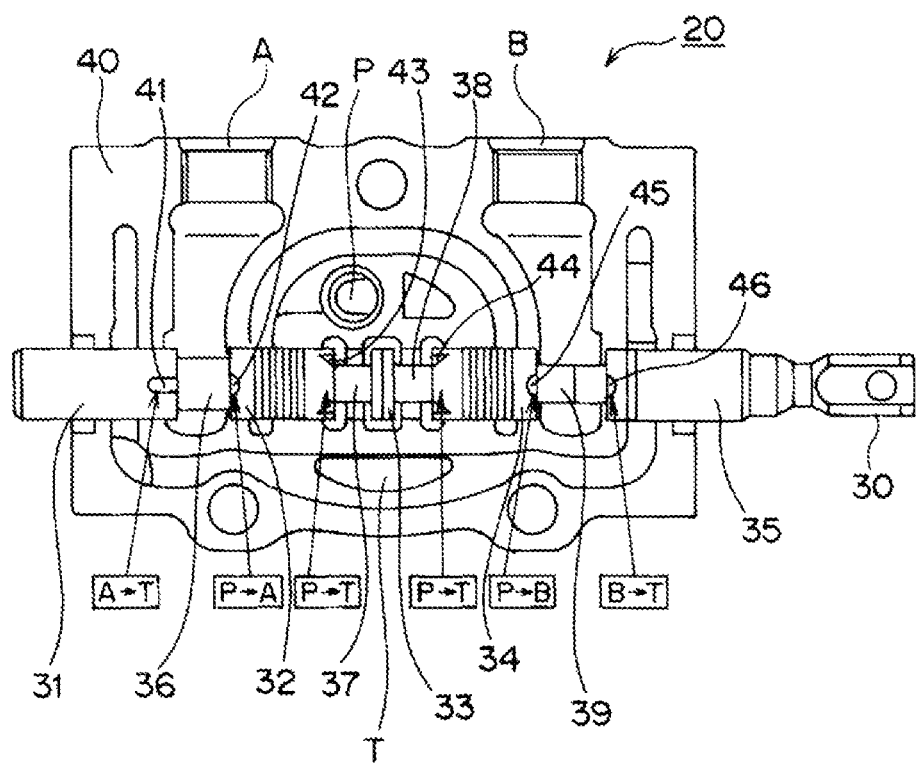
FIG. 2 is a sectional view of the control valve 20 according to the present invention.

Next, a configuration of the control valve 20 according to the present invention is described. FIG. 2 is a sectional view of the control valve 20 according to the present invention. Moreover, the drawing shows a state that a main spool 30 is disposed at a neutral position.

The control valve 20 is a control valve that is coupled to the hydraulic cylinder 18 which moves the mast 12 that lifts and lowers the fork 11. The control valve 20 is a control valve that selectively connects a first passage P to which high-pressure hydraulic oil is introduced from a hydraulic pump and a second passage T which is open at a low-pressure region such as a hydraulic tank to a reach-in side actuator port A for biasing a piston 19 of the hydraulic cylinder 18 toward a side at which the mast 12 is moved rearward and a reach-out side actuator port B for biasing the piston 19 of the hydraulic cylinder 18 toward a side at which the mast 12 is moved frontward.

The control valve 20 includes the main spool 30 in which a plurality of lands 31, 32, 33, 34, and 35 and a plurality of grooves 36, 37, 38, and 39 are alternately formed and which can reciprocate with respect to a valve body 40 in a right-left direction shown in FIG. 2. A right-hand end portion of the main spool 30 is connected to the lever 17 shown in FIG. 1.

On the land 31, a cut-out portion 41 (A→T) is formed which is used when hydraulic oil flows toward the second passage T open at the low-pressure region such as the hydraulic tank from the reach-in side actuator port A for biasing the piston 19 of the hydraulic cylinder 18 toward the side at which the mast 12 is moved rearward. The cut-out portion 41 is a cutting region that is also referred to as a notch. When the hydraulic oil flows from the reach-in side actuator port A toward the second passage T, and a transition from a state that the flowing of the hydraulic oil is prevented by the land 31 to a state that the flowing of the hydraulic oil is allowed by the groove 36 occurs once, an impact occurs in the control valve 20 due to action of the high-pressure hydraulic oil. Hence, flow of the hydraulic oil via the cut-out portion 41 prevents the impact from occurring.

For similar reasons, on the land 32, a cut-out portion 42 (P→A) is formed which is used when the hydraulic oil flows from the first passage P to the reach-in side actuator port A and a cut-out portion 43 (P→T) is formed which is used when the hydraulic oil flows from the first passage P to the second passage T. In addition, on the land 34, a cut-out portion 44 (P→T) is formed which is used when the hydraulic oil flows from the first passage P to the second passage T and a cut-out portion 45 (P→B) is formed which is used when the hydraulic oil flows from the first passage P to the reach-out side actuator port B. Further, on the land 35, a cut-out portion 46 (B→T) is formed which is used when the hydraulic oil flows from the reach-out side actuator port B to the second passage T.

Figure 3:
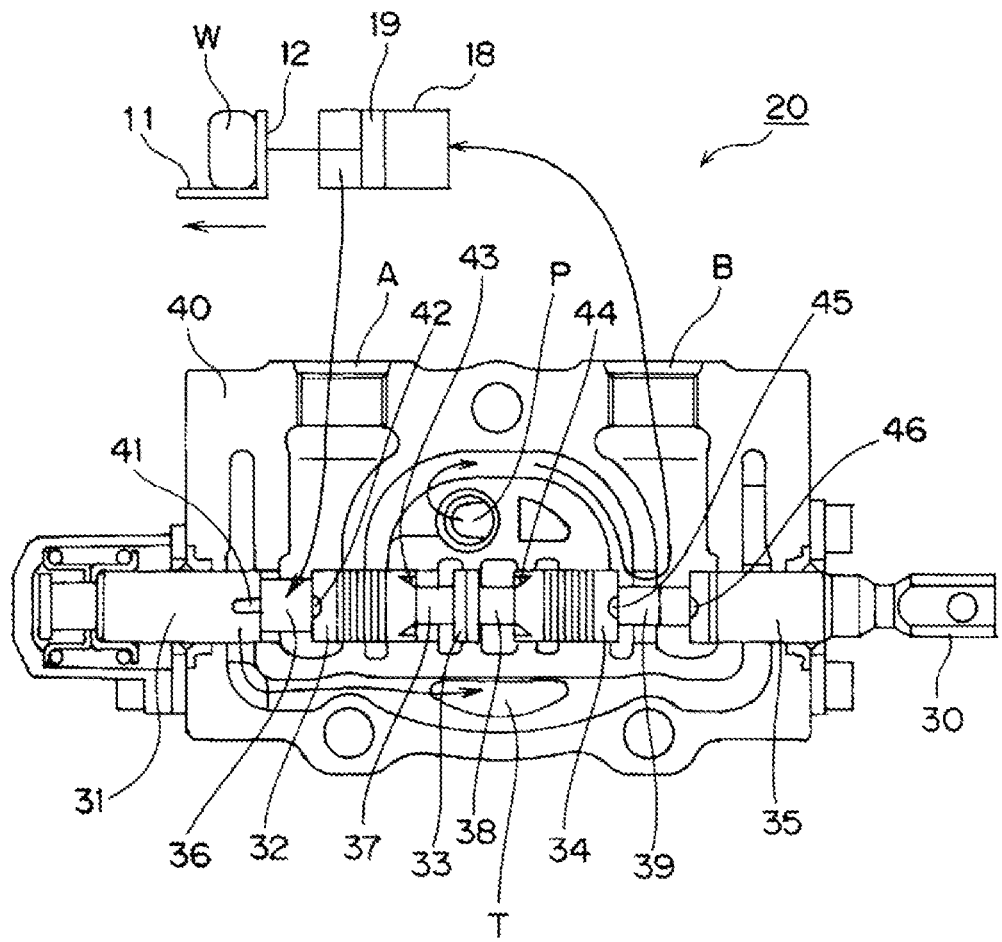
FIG. 3 is a sectional view of the control valve 20 according to the present invention.
Figure 4:
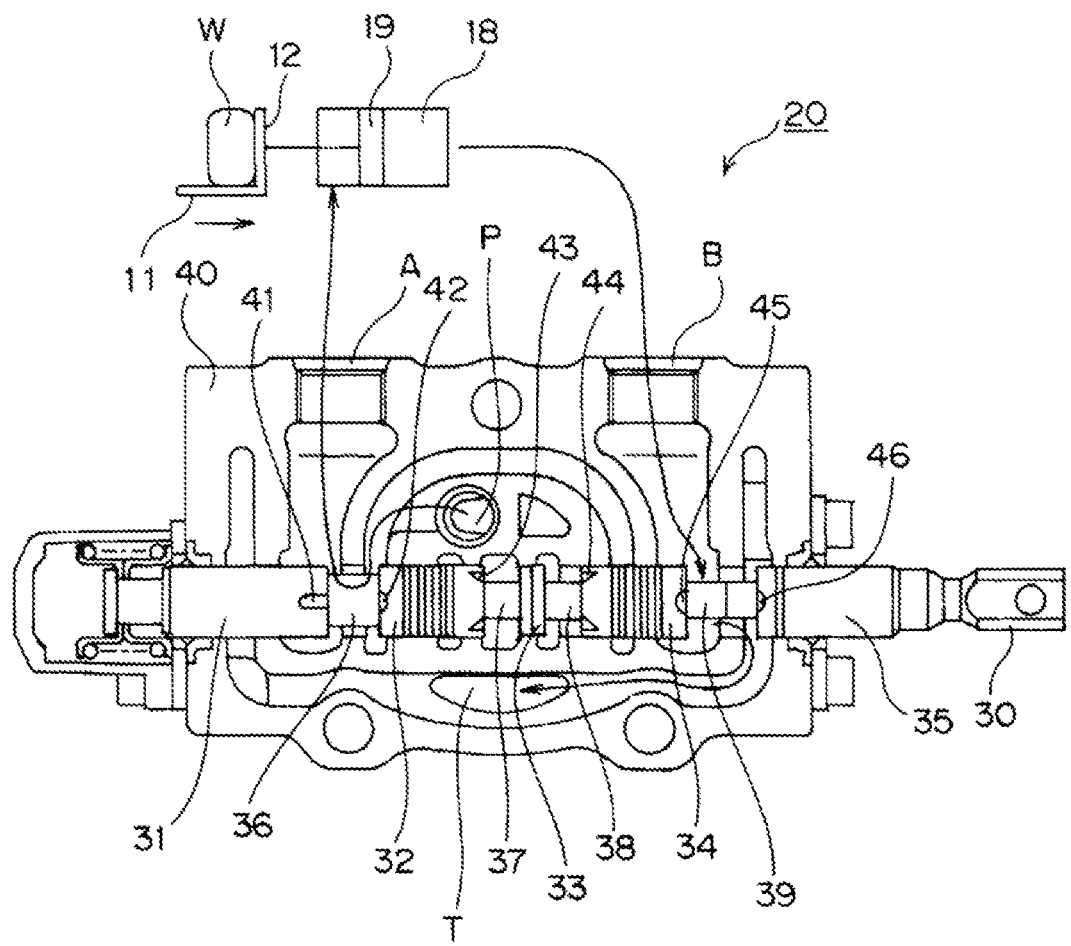
FIG. 4 is a sectional view of the control valve 20 according to the present invention.

Next, operations of the control valve 20 according to the present invention are described. FIGS. 3 and 4 are sectional views of the control valve 20, which are used to describe the operations of the control valve 20 according to the present invention. Moreover, in the drawings, the control valve 20, a workpiece W, the fork 11, the mast 12, and the hydraulic cylinder 18 are schematically show. Here, FIG. 3 shows a state that the main spool 30 is disposed at a left-hand position, and FIG. 4 shows a state that the main spool 30 is disposed at a right-hand position.

As shown in FIG. 2, in the state that the main spool 30 is disposed at the neutral position, the reach-in side actuator port A for biasing the piston 19 of the hydraulic cylinder 18 toward the side at which the mast 12 is moved rearward and the reach-out side actuator port B for biasing the piston 19 of the hydraulic cylinder 18 toward the side at which the mast 12 is moved frontward are blocked, by the action of the plurality of lands 31, 32, 33, 34, and 35 in the main spool 30, from the first passage P to which the high-pressure hydraulic oil is introduced from the hydraulic pump and the second passage T which is open at the low-pressure region such as the hydraulic tank. Hence, the hydraulic oil is not pressure-fed to the hydraulic cylinder 18.

When an operator operates the lever 17 shown in FIG. 1 from the state described above and thereby moves the main spool 30 coupled to the lever 17 toward a left-hand side as shown in FIG. 3, the cut-out portion 45 and the groove 39 function to form a path of the hydraulic oil from the first passage P to which the high-pressure hydraulic oil is introduced to the reach-out side actuator port B. In addition, the cut-out portion 41 functions to form a path of the hydraulic oil from the reach-in side actuator port A to the second passage T which is open at the low-pressure region such as the hydraulic tank. Consequently, the hydraulic oil flows as shown by an arrow in FIG. 3, the piston 19 of the hydraulic cylinder 18 moves toward the left-hand side shown in FIG. 3, and the mast 12 that lifts and lowers the fork 11 comes into the reach-out state that the mast is moved frontward from a side of the main body 13.

On the other hand, when the operator operates the lever 17 shown in FIG. 1 from the state shown in FIG. 2 and thereby moves the main spool 30 coupled to the lever 17 toward a right-hand side as shown in FIG. 4, the cut-out portion 42 and the groove 36 function to form a path of the hydraulic oil from the first passage P to which the high-pressure hydraulic oil is introduced to the reach-in side actuator port A. In addition, the cut-out portion 46 and the groove 39 function to form a path of the hydraulic oil from the reach-out side actuator port B to the second passage T which is open at the low-pressure region such as the hydraulic tank. Consequently, the hydraulic oil flows as shown by an arrow in FIG. 4, the piston 19 of the hydraulic cylinder 18 moves toward the right-hand side shown in FIG. 4, and the mast 12 that lifts and lowers the fork 11 comes into the reach-in state that the mast is moved toward the side of the main body 13.

In the control valve 20, when the operator operates the lever 17 shown in FIG. 1 in a state that the fork 11 supports the workpiece W, and thereby the mast 12 that lifts and lowers the fork 11 comes into the reach-out state that the mast is moved frontward from the side of the main body 13, the reach forklift 10 is abruptly stopped in some cases. In these cases, a force to cause the mast 12 to be separated from the main body 13 and to move in a traveling direction of a vehicle body is generated due to the inertial force of the workpiece W, or the inertial force of the fork 11 and the mast 12. Since the force is transmitted to the hydraulic cylinder 18, a pressure of the hydraulic oil in the hydraulic cylinder 18 is reduced, and a force of the hydraulic cylinder 18 to restrict a position of the mast 12 in the front-rear direction becomes unstable. Accordingly, the mast 12, the fork 11 and the workpiece W which are supported by the mast come into an unstable state.

Figure 5:
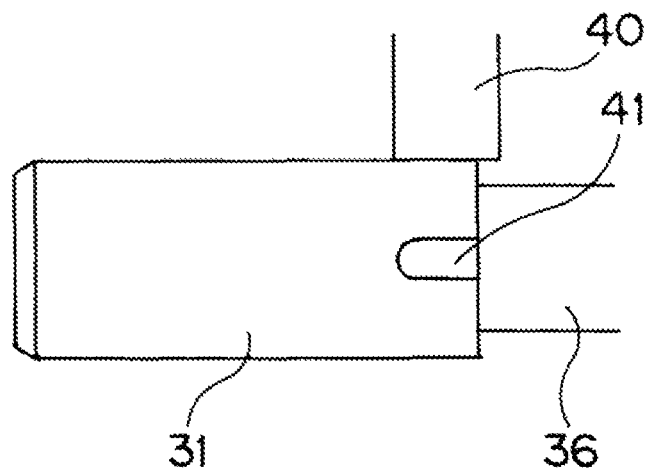
FIG. 5 is a plan view showing a relationship between a valve body 40 and a cut-out portion 41 formed on a land 31 in a main spool 30.
Figure 6:
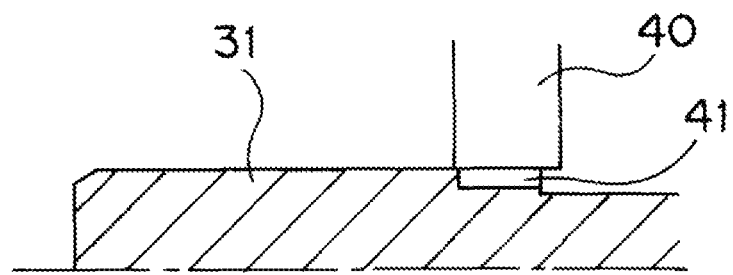
FIG. 6 is a vertical-sectional view showing a relationship between the valve body 40 and the cut-out portion 41 formed on the land 31 in the main spool 30, the relationship being shown as a reference example.
Figure 7:
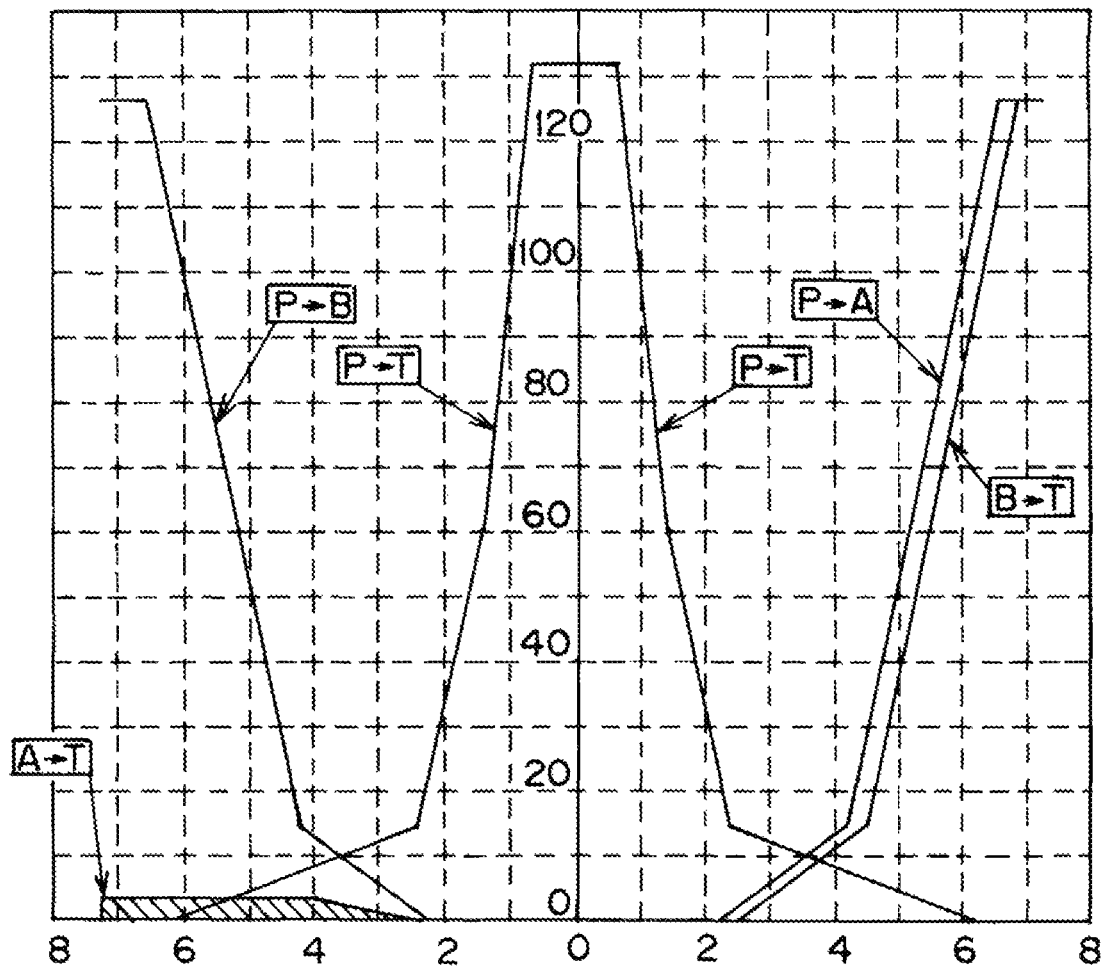
FIG. 7 is a graph showing a relationship between a position of the main spool 30 and an area of an opening formed by cut-out portions 41, 42, 43, 44, 45, 46, and the like between the valve body 40 and lands 31, 32, 33, 34, and 35, when the main spool is disposed at the position.
Figure 8:
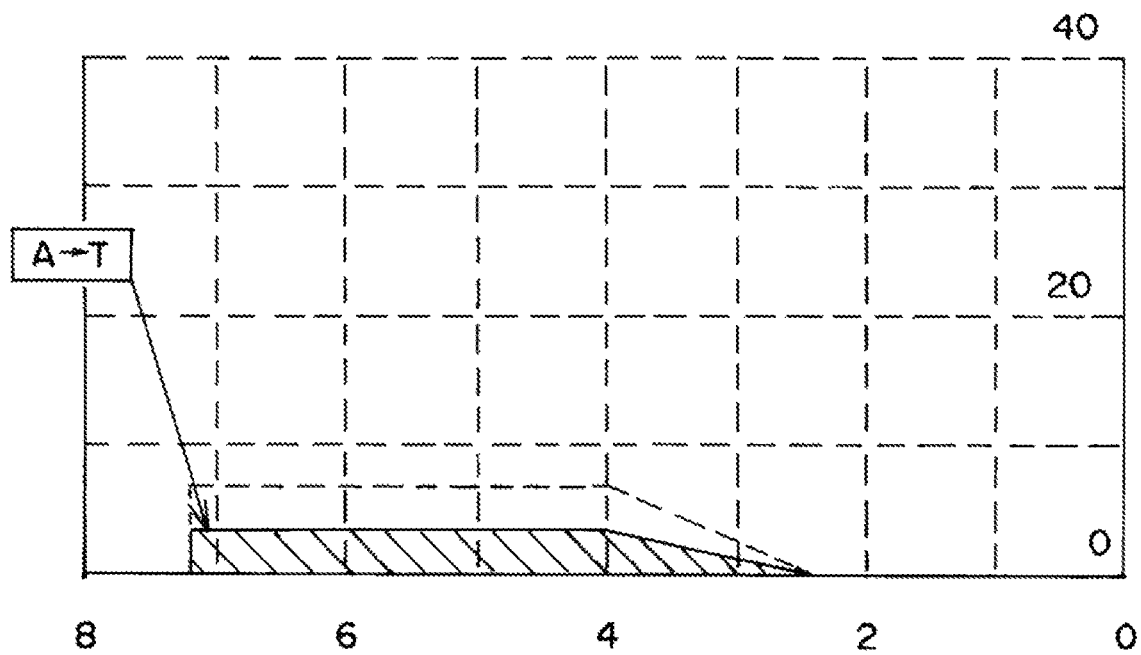
FIG. 8 is an enlarged view of a part in FIG. 7 having the area of the opening formed between the valve body 40 and the land 31 in a passage of hydraulic oil from a reach-in side actuator port A to a second passage T.

The above situation is described more specifically. FIG. 5 is a plan view showing a relationship between the valve body 40 and the cut-out portion 41 formed on the land 31 in the main spool 30, the relationship being shown as a reference example. FIG. 6 is a vertical-sectional view showing the relationship between the valve body 40 and the cut-out portion 41 formed on the land 31 in the main spool 30, the relationship being shown as a reference example. FIG. 7 is a graph showing a relationship between a position of the main spool 30 and an area of an opening formed by the cut-out portions 41, 42, 43, 44, 45, 46, and the like between the valve body 40 and the lands 31, 32, 33, 34, and 35, when the main spool is disposed at the position. FIG. 8 is an enlarged view of a part in FIG. 7 having the area of the opening formed, by the cut-out portion 41 shown in FIGS. 5 and 6, between the valve body 40 and the land 31 in a passage of the hydraulic oil from the reach-in side actuator port A to the second passage T. Moreover, in FIGS. 7 and 8, the horizontal axis represents a movement distance of the main spool 30, and the vertical axis represents the area of the opening (square millimeter).

For example, as shown by a dashed line in FIG. 8, in a case that the area of the opening formed by the cut-out portion 41 between the valve body 40 and the land 31 in the passage of the hydraulic oil from the reach-in side actuator port A to the second passage T is set to be large, as described above, the mast 12 and the fork 11 and the workpiece W that are supported by the mast come into an unstable state, when the mast 12 comes into the reach-out state and the reach forklift 10 is abruptly stopped. In contrast, as shown by a hatched part in FIG. 8, in a case that the area of the opening formed by the cut-out portion 41 between the valve body 40 and the land 31 in the passage of the hydraulic oil from the reach-in side actuator port A to the second passage T is set to be small, unstableness of the mast 12 is reduced.

However, in a case that the area of the opening formed by the cut-out portion 41 between the valve body 40 and the land 31 in the passage of the hydraulic oil from the reach-in side actuator port A to the second passage T is set to be small, a flow rate of the hydraulic oil that passes through a region of the area of the opening decreases, and thus a problem arises in that a frontward moving speed of the fork 11 decreases in a case that a reach-out operation is executed.

In addition, in a case that the area of the opening formed by the cut-out portion 41 between the valve body 40 and the land 31 in the passage of the hydraulic oil from the reach-in side actuator port A to the second passage T is set to be small, a supply pressure of the hydraulic oil with respect to the hydraulic cylinder 18 increases when a reach-out operation is executed by the lever 17, and power consumption for driving the hydraulic pump that supplies the hydraulic oil increases. Hence, a problem arises in that a battery is quickly drained.

Hence, in the control valve 20 according to the present invention, the cut-out portion 41 is formed on the land 31 in the main spool 30 that blocks the reach-in side actuator port A from communicating with the second passage T, and the cut-out portion 41 is made to have a shape in which the area of the opening formed between the valve body 40 and the land 31 changes in two steps, thereby solving the above problem.

Figure 9:
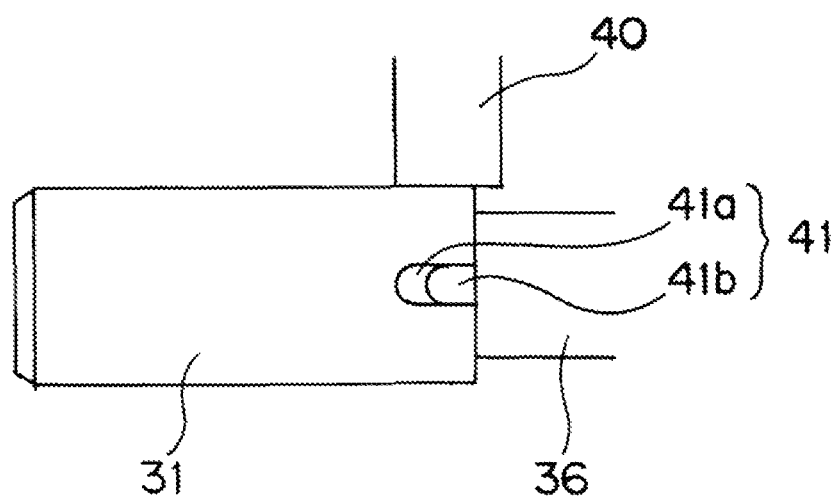
FIG. 9 is a plan view showing a relationship between the valve body 40 and the cut-out portion 41 formed on the land 31 in the main spool 30.
Figure 10:
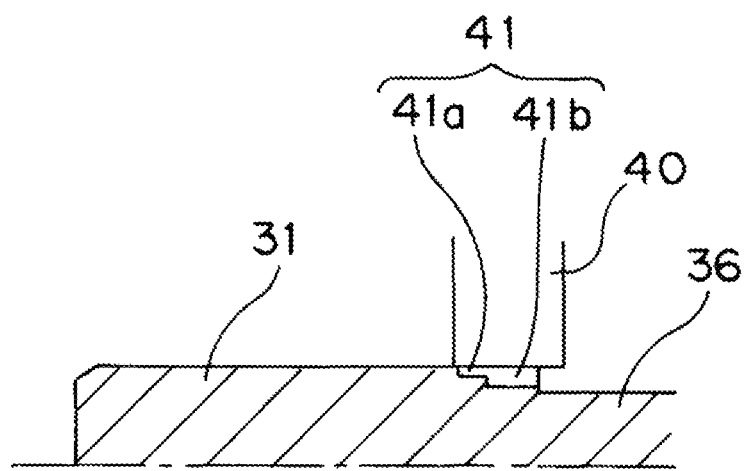
FIG. 10 is a vertical-sectional view showing a relationship between the valve body 40 and the cut-out portion 41 formed on the land 31 in the main spool 30.
Figure 11:
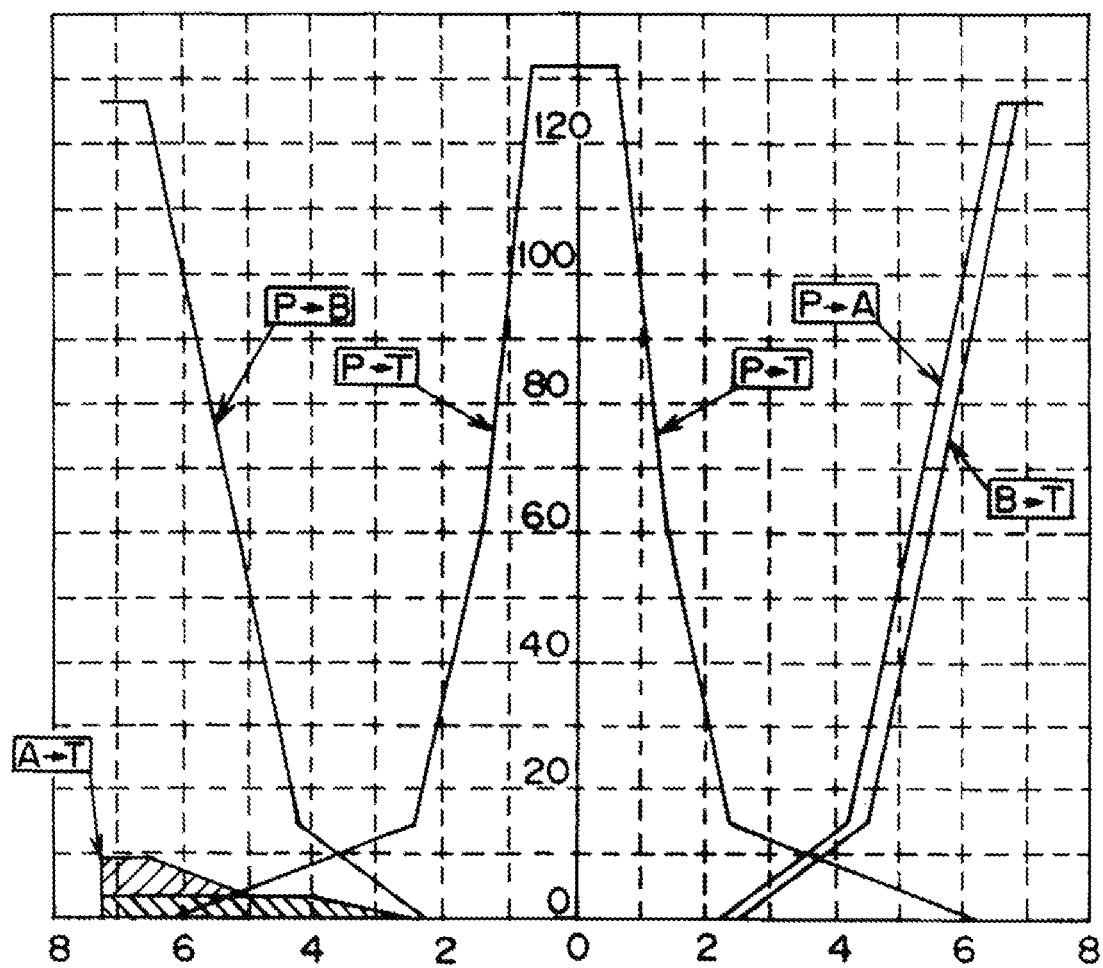
FIG. 11 is a graph showing a relationship between a position of the main spool 30 and an area of an opening formed by cut-out portions 41, 42, 43, 44, 45, 46, and the like between the valve body 40 and lands 31, 32, 33, 34, and 35, when the main spool is disposed at the position.
Figure 12:
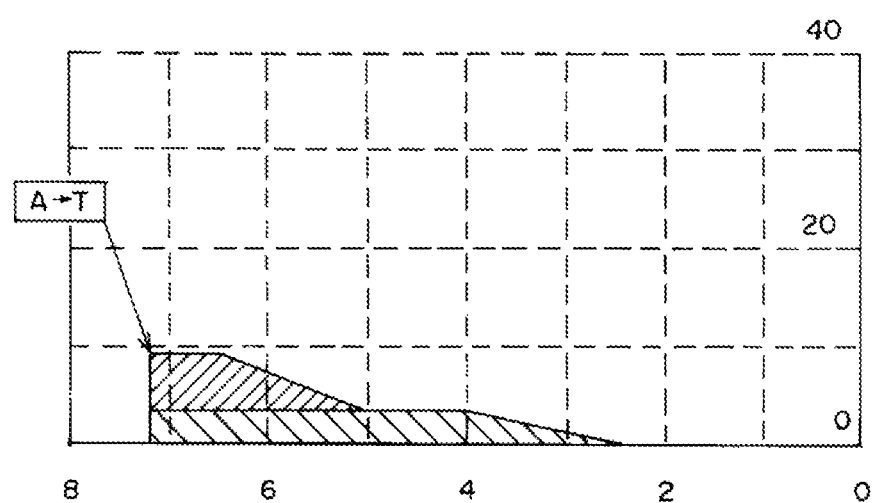
FIG. 12 is an enlarged view of a part in FIG. 11 having the area of the opening formed between the valve body 40 and the land 31 in the passage of hydraulic oil from the reach-in side actuator port A to the second passage T.

FIG. 9 is a plan view showing a relationship between the valve body 40 and the cut-out portion 41 formed on the land 31 in the main spool 30, in the control valve 20 according to the present invention. FIG. 10 is a vertical-sectional view showing a relationship between the valve body 40 and the cut-out portion 41 formed on the land 31 in the main spool 30, in the control valve 20 according to the present invention. FIG. 11 is a graph showing a relationship between a position of the main spool 30 and the area of the opening formed by the cut-out portions 41, 42, 43, 44, 45, 46, and the like between the valve body 40 and the lands 31, 32, 33, 34, and 35, when the main spool is disposed at the position. FIG. 12 is an enlarged view of a part in FIG. 11 having the area of the opening formed, by the cut-out portion 41 shown in FIGS. 9 and 10, between the valve body 40 and the land 31 in the passage of the hydraulic oil from the reach-in side actuator port A to the second passage T. Moreover, in FIGS. 11 and 12, the horizontal axis represents a movement distance of the main spool 30, and the vertical axis represents the area of the opening (square millimeter).

As shown in the drawings, in the control valve 20 according to the present invention, the cut-out portion 41 is formed on the land 31 in the main spool 30 that blocks the reach-in side actuator port A from communicating with the second passage T, and the cut-out portion 41 is configured of a first cut-out portion 41a and a second cut-out portion 41b, and thereby has a shape in which a distance between the valve body 40 and a surface of the cut-out portion 41 changes in two steps.

More specifically, the first cut-out portion 41a of the cut-out portion 41 is configured of a first region which has a semi-circular shape in a plan view and in which the area of an opening between the valve body 40 and the land 31 becomes gradually larger and a second region which is connected to the first region and in which the area of an opening between the valve body 40 and the land 31 is constant, and the second cut-out portion 41b of the cut-out portion 41 is configured of a third region which has a semi-circular shape in a plan view and in which the area of an opening between the valve body 40 and the land 31 becomes gradually larger and a fourth region which is connected to the third region and in which the area of an opening between the valve body 40 and the land 31 is constant. Further, a distance from a surface in the first region and a surface in the second region to the valve body 40 is set as a first distance, and a distance from a surface in the third region and a surface in the fourth region to the valve body 40 is set as a second distance longer than the first distance.

By employing the above configuration, the first cut-out portion 41a is used to communicate the reach-in side actuator port A with the second passage T during the normal reach-out operation, and thereby it is possible to decrease the area of the opening formed between the valve body 40 and the land 31 in the passage of the hydraulic oil from the reach-in side actuator port A to the second passage T. Consequently, it is possible to control a flow rate of the hydraulic oil that flows from the reach-in side actuator port A to the second passage T, and it is possible to reduce unstableness of the mast 12 even in a case that the reach forklift 10 is abruptly stopped when the mast 12 comes into the reach-out state.

On the other hand, the second cut-out portion 41b is used to communicate the reach-in side actuator port A with the second passage T during the normal operation, and thereby it is possible to increase the area of the opening formed between the valve body 40 and the land 31 in the passage of the hydraulic oil from the reach-in side actuator port A to the second passage T. Consequently, in a case that the reach-out operation is executed, a problem of a decrease in frontward movement speed of the fork 11 can be prevented from arising.

In addition, since the area of the opening formed by the cut-out portion 41 between the valve body 40 and the land 31 in the passage of the hydraulic oil from the reach-in side actuator port A to the second passage T can be set to be large, and the supply pressure of the hydraulic oil with respect to the hydraulic cylinder 18 does not increase when the reach-out operation is executed by the lever 17, the power consumption for driving the hydraulic pump that supplies the hydraulic oil does not increase. Hence, consumption of a battery can be reduced.

In the embodiment described above, the first cut-out portion 41a of the cut-out portion 41 is configured of the first region which has a semi-circular shape in a plan view and in which the area of the opening between the valve body 40 and the land 31 becomes gradually larger and the second region which is connected to the first region and in which the area of the opening between the valve body 40 and the land 31 is constant, and the second cut-out portion 41b of the cut-out portion 41 is configured of the third region which has a semi-circular shape in a plan view and in which the area of the opening between the valve body 40 and the land 31 becomes gradually larger and the fourth region which is connected to the third region and in which the area of the opening between the valve body 40 and the land 31 is constant. By employing the above shape, it is possible to form the first cut-out portion 41a and the second cut-out portion 41b in two steps by milling using an end mill. Hence, it is possible to easily process the cut-out portion 41 at a low cost.

Moreover, in the embodiment described above, the cut-out portion 41 is formed on the land 31 in the spool 30 that blocks the reach-in side actuator port A from communicating with the second passage T, and the cut-out portion 41 has a shape in which the distance between the valve body 40 and the surface of the cut-out portion 41 changes in two steps. However, the cut-out portion 41 may be formed, by changing a dimension of the cut-out portion 41 in a width direction, into a shape in which the area of the opening formed between the valve body 40 and the land 31 changes in two steps.

What is claimed is:

1. A control valve coupled to a hydraulic cylinder for moving a mast frontward and rearward, wherein the mast is used for lifting and lowering a fork, the control valve moves a spool with respect to a valve body, and thereby selectively connects a first passage and a second passage to a reach-out side actuator port and a reach-in side actuator port, wherein the first passage to which high-pressure hydraulic oil is introduced, the second passage which is open at a low-pressure region, the reach-out side actuator port for biasing a piston of the hydraulic cylinder toward a side at which the mast is moved frontward, and the reach-in side actuator port for biasing the piston of the hydraulic cylinder toward a side at which the mast is moved rearward, wherein a cut-out portion is formed on a land in the spool that blocks the reach-in side actuator port from communicating with the second passage, and the cut-out portion has a shape in which an area of an opening formed between the valve body and the land changes in two steps, wherein the cut-out portion formed on the land in the spool that blocks the reach-in side actuator port from communicating with the second passage comprises a first region, a second region, a third region and a fourth region, and the first region in which the area of the opening between the valve body and the land becomes gradually larger, the second region which is connected to the first region and in which the area of the opening between the valve body and the land is constant, the third region which is connected to the second region and in which the area of the opening between the valve body and the land becomes gradually larger, and the fourth region which is connected to the third region and in which the area of the opening between the valve body and the land is constant, wherein a distance from a surface in the first region and a surface in the second region to the valve body is set as a first distance, and a distance from a surface in the third region and a surface in the fourth region to the valve body is set as a second distance longer than the first distance, wherein the first region and the third region have a semi-circular shape in a plan view, and wherein a dimension of the second region and the fourth region in a width direction are the same.

2. The control valve according to claim 1, wherein by increasing the area of the opening formed between the valve body and the land, a frontward movement speed of the fork becomes higher than when the area of the opening formed between the valve body and the land is small.

\* \* \* \* \*